(12) United States Patent
Masui et al.

(10) Patent No.: US 7,003,680 B2
(45) Date of Patent: Feb. 21, 2006

(54) CONTACTLESS APPARATUS AND CARD-TYPE DEVICE HAVING CLOCK RECTIFIER THAT IS INDEPENDENT OF POWER RECTIFIER AND DEMODULATOR WITH RC TIME CONSTANT BASED ON SELECTABLE RESISTOR

(75) Inventors: Shoichi Masui, Kawasaki (JP); Yoshiaki Kaneko, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 604 days.

(21) Appl. No.: 10/060,370

(22) Filed: Feb. 1, 2002

(65) Prior Publication Data
US 2002/0108066 A1 Aug. 8, 2002

(30) Foreign Application Priority Data
Feb. 8, 2001 (JP) .............................. 2001-031642

(51) Int. Cl.
*G06F 1/26* (2006.01)
(52) U.S. Cl. .................. 713/300; 235/492; 329/870.31
(58) Field of Classification Search ................ 235/492; 329/347; 340/870.31; 713/300
See application file for complete search history.

(56) References Cited

U.S. PATENT DOCUMENTS

| 5,847,447 A | | 12/1998 | Rozin et al. | |
| 5,889,273 A | * | 3/1999 | Goto ........................... | 235/492 |
| 5,914,980 A | * | 6/1999 | Yokota et al. ............... | 375/130 |
| 6,784,730 B1 | * | 8/2004 | Arisawa ....................... | 329/311 |

FOREIGN PATENT DOCUMENTS

| EP | 0 289 136 | 11/1988 |
| EP | 0 764 920 | 3/1997 |

OTHER PUBLICATIONS

EM Micoelectronic, "P4150—1 KBit read/write contactless identification device", Dec. 1999.*
Patent Abstract of Japan vol. 2000, No. 03, Mar. 30, 2000 & JP 11 355367, Dec. 24, 1999.

* cited by examiner

*Primary Examiner*—Thomas Lee
*Assistant Examiner*—Albert Wang
(74) *Attorney, Agent, or Firm*—Arent Fox PLLC

(57) ABSTRACT

An information processing apparatus receives a carrier wave modulated in accordance with information and extracts the information and power therefrom to execute a given process. A receiving circuit receives the carrier wave. A dc power generating circuit rectifies the carrier wave received by the receiving circuit to thereby generate dc power. A demodulation circuit is structurally independent of the dc power generating circuit, and retrieves the information modulated onto the carrier wave. An information processing circuit is supplied with the dc power as a power source, and processes the information retrieved by the demodulation circuit in a given manner. Since the demodulation circuit and the dc power generating circuit are structurally independent of each other, interference between elements included in these circuits can be eliminated and simple designing is enabled. In addition, power consumed in the apparatus can be reduced because of optimal designing.

4 Claims, 12 Drawing Sheets

CONTACTLESS APPARATUS AND CARD-TYPE DEVICE HAVING CLOCK RECTIFIER THAT IS INDEPENDENT OF POWER RECTIFIER AND DEMODULATOR WITH RC TIME CONSTANT BASED ON SELECTABLE RESISTOR

BACKGROUND OF THE INVENTION (1) Field of the Invention

The present invention relates to information processing apparatuses and card-type information processing devices, and more particularly, to an information processing apparatus and a card-type information processing device, each receiving a carrier wave that has been modulated in accordance with information and extracting information and power therefrom to execute a predetermined process.

(2) Description of the Related Art

Recently, a card-type information processing device with a contactless interface has been developed and expected to be placed for not only the personal use such as a credit card or commuter pass but also the industrial use such as a tag in factory automation and product management.

The physical interface prescribed in the ISO/IEC 14443 Part 2 is known as a radio wave interface of such a card-type information processing device. Particularly, a card equipped with a CPU as an LSI for smart cards needs constant supply of power and clock, and therefore employs the Type B specification of the above-mentioned standard.

FIG. 10 is a diagram of a conventional configuration of the card-type device with the contactless interface that matches the Type B specification.

In FIG. 10, a reader/writer 10 is made up of an oscillation circuit 11, an interface (I/F) 12, a modulation circuit 13, a transmitting circuit 14, an antenna 15, a receiving circuit 16, and a demodulation circuit 17. A radio wave is used to send and receive information to and from a card-type information processing device 20.

The oscillation circuit 11 generates a carrier wave of 13.56 MHz.

The I/F 12, which is connected to an upper computer that is not shown for the sake of simplicity, receives information to be sent to the card-type information processing device 20 and outputs information received therefrom.

The modulation circuit 13 modulates the amplitude of the carrier wave from the oscillation circuit 11 (ASK modulation: Amplitude Shift Keying).

The transmitting circuit 14 sends the ASK-modulated carrier wave via the antenna 15.

The antenna 15 radiates the signal supplied from the transmitting circuit 14 in the form of a radio wave, while capturing a radio wave from the card-type information processing device 20 and supplying it to the receiving circuit 16.

The receiving circuit 16 converts the radio wave captured by the antenna 15 into an electric signal.

The demodulation circuit 17 demodulates the electric signal from the receiving circuit 16 to thereby extract information modulated onto the carrier wave.

The card-type information processing device 20 is made up of an antenna 21, a capacitor 22, a full-wave rectifier circuit 23, a capacitor 24, a voltage stabilizing part 25, an ASK demodulator part 26, a capacitor 27, an information processing part 28, a transmitting circuit 29, and a carrier clock extracting circuit 30. The card-type information processing device 20 is driven by power sent by the reader/writer in the form of radio wave. The card-type information processing device 20 retrieves information superimposed in the electric wave, and processes the information in various ways. Resultant information thus obtained is sent back to the reader/writer 10.

The antenna 21 captures the radio wave sent by the reader/writer 10, and radiates the signal from the transmitting circuit 29 toward the reader/writer 10 in the form of radio wave.

The capacitor 22 combines with the inductance component to form parallel resonant circuit, which acts to increase power that can be received by the card-type information processing device 20.

The full-wave rectifier circuit 23 extracts dc power from the received radio wave.

The capacitor 24 eliminates a carrier ripple component overlaid onto the dc power from the full-wave rectifier circuit 23, and generates the ASK modulated wave by envelope detection, as will be described later.

The voltage stabilizing part 25 stabilizes the dc power from which the ripple component has been eliminated at a constant voltage.

The ASK demodulation part 26 extracts information from the signal after the envelope generation through ASK demodulation.

The capacitor 27 eliminates the ripple component contained in the power supply voltage supplied to the information processing part 28.

The information processing part 28 may, for example, be made of a CPU (Central Processing Unit), a ROM (Read Only Memory), a RAM (Random Access Memory) and an encrypt circuit. The information processing part 28 processes information retrieved by the ASK demodulation circuit 26 in various ways.

The transmitting circuit 29 sends the results of information processing by the information processing part 28 to the reader/writer 10 via the antenna 21.

The carrier clock extracting circuit 30 extracts a clock of 13.56 MHz from the received carrier wave of 13.56 MHz, the clock being supplied to the information processing part 28.

FIG. 11 is a diagram of a conventional configuration of the card-type information processing device 20. As shown in FIG. 11, the full-wave rectifier circuit 23 is composed of diodes 23*a* through 23*d*. The voltage stabilizing part 25 is composed of a resistor 25*a* and a voltage stabilizing circuit 25*b*. The ASK demodulation part 26 is composed of a resistor 26*a* and an ASK demodulation circuit 26*b*.

The diodes 23*a* through 23*d* rectify the full wave of an RF signal from the antenna 21 and result in a dc signal.

The resistor 25*a* makes isolation for eliminating interference between the capacitor 24 and the capacitor 27.

The voltage stabilizing circuit 25*b* stabilizes the voltage to be supplied to the information processing part 28 at a constant level.

The resistor 26*a* cooperates with the capacitor 24 and detects the signals from the diodes 23*a*–23*d* in envelope detection.

The ASK demodulation circuit 26*b* ASK-demodulates the detected signal from the resistor 26*a* and the capacitor 24 to thereby extract information therefrom.

FIG. 12 is a circuit diagram of a conventional configuration of the carrier clock extracting circuit 30. As shown in FIG. 12, the carrier clock extracting circuit 30 includes N-channel MOS-FETs (Metal-Oxide Semiconductor Field Effect Transistor) 30*a* and 30*b*, P-channel MOS FETs 30*c* and 30*d*, a constant-current source 30*e*, and a level shift circuit 30*f*.

A differential amplifier is formed by the N-channel MOS-FETs 30a and 30b, P-channel MOS-FETs 30c and 30d, and the constant-current source 30e. The differential amplifier amplifies the voltage difference between RF signals RF1 and RF2 from the antenna 21, the amplified difference being applied to the level shift circuit 30f.

The level shift circuit 30f shifts the level of the signal from the differential amplifier to a level of a digital signal. The output signal of the level shift circuit 30f is a carrier clock.

The conventional device described above operates as follows.

The oscillation circuit 11 generates the carrier wave of 13.56 MHz, which is supplied to the modulation circuit 13. The modulation circuit 13 modulates information to be sent to the card-type information processing device 20 onto the carrier wave from the oscillation circuit 11 in ASK modulation. The modulated carrier wave is sent to the transmitting circuit 14.

The transmitting circuit 14 transmits the radio wave corresponding to the signal from the modulation circuit 13 via the antenna 15.

The antenna 15 radiates the radio wave toward the card-type information processing device 20.

The antenna 21 of the card-type information processing device 20 captures the radio wave emitted by the reader/writer 10, and supplies it to the full-wave rectifier circuit 23. The inductance component of the antenna 21 cooperates with the capacitor 22 to form a parallel resonant circuit, which increase the power that can be received by the card-type information processing device 20.

The diodes 23a–23d rectify the RF signals RF1 and RF2 from the antenna 21.

The capacitor 24 and the resistor 26a eliminate a ripple component overlaid onto the dc signal from the diodes 23a–23d, and detect the envelope of the dc signal by envelope detection.

The ASK demodulation circuit 26b demodulates the envelope-detected signal in ASK to thereby retrieve original information (information item "0" or "1"), which is then supplied to the information processing part 28.

The resistor 25a prevents interference between the capacitor 24 and the capacitor 27. That is, the resistor 25a prevents the ASK signal across the capacitor 24 from being supplied to the information processing part 28.

The voltage stabilizing circuit 25b acts to supply a constant dc voltage to the information processing part 28.

The capacitor 27 eliminates a ripple component contained in the power supply voltage from the voltage stabilizing circuit 25b.

The differential amplifier, which is made up of the N-channel MOS-FETs 30a and 30b and the P-channel MOS-FETs 30c and 30d amplifies the difference signal between the RF signals RF1 and RF2 with a predetermined gain. This results in a signal of 13.56 MHz. The level shift circuit 30f converts the signal of 13.56 MHz into the level of the digital signal, which is supplied to the information processing part 28 as a clock.

In the above-mentioned manner, the information processing part 28 is supplied with the power from the voltage stabilizing circuit 25b, the received information from the ASK demodulation circuit 26b, and the clock from the carrier clock extracting circuit 30. Then, the information processing part 28 processes the information from the ASK demodulation circuit 26b in a given manner in synchronism with the clock from the carrier clock extracting circuit 30.

The resultant information is sent back to the reader/writer 10 via the transmitting circuit 29.

The reader/writer 10 captures the radio wave returned from the card-type information processing device 20, the radio wave being converted into the electric signal, from which information is extracted by the demodulation circuit 17.

The information thus obtained is transferred to the upper computer via the I/F 12.

Recently, there has been an increasing demand for improvement in the capability of processing of the card-type information processing device 20, and an increased clock frequency has been needed accordingly. However, this increases current consumed in the information processing part 28.

As the power consumption in the information processing part 28 increases, the capacitor 27 is needed to have an increased capacity as large as 1000 pF or more in order to effectively eliminate the ripple component contained in the power supply voltage. In order to establish sufficient isolation from the capacitor 24 for use in reception, the resistor 25a is needed to have a larger resistance value. However, the above necessity may not be permitted in terms of the breakdown voltage. For instance, nowadays, it is not unusual to allow current as large as 10 mA to flow in the information processing part 28. Also, the resistor 25a is often required to have a resistance value equal to or greater than 1 kΩ. When 10 mA current flows through the 1 kΩ resistor, a voltage drop of approximately 10 V occurs. Therefore, the above may not be permitted for circuits consisting of elements with a breakdown voltage approximately equal to 10 V.

If the resistor 25a having a smaller resistance is used, the capacitor 24 for the envelope detection will have an increased capacitance because of the capacitor 27. This deteriorates the envelope detection.

As described above, the card-type information processing device 20 has various unexpected problems occur due to increase in power consumed in the information processing part 28, and no means for solving these problems has not yet been proposed.

Further, in the above-mentioned conventional art, as shown in FIG. 12, the clock is generated in such a manner that the differential signal between RF1 and RF2 is extracted by the differential amplifier, and is level-shifted by the level shift circuit 30f. When the analog signal is converted into the digital signal, the duty ratio may not equal to 50% because of noise and dispersion in performance. This causes unstable circuit operation.

SUMMARY OF THE INVENTION

Taking the above into consideration, an object of the present invention is to provide an information processing apparatus and a card-type information processing device that receives a carrier wave modulated in accordance with information and extracting the information and power from the carrier wave to thereby execute a predetermined process, wherein the apparatus and device can be easily designed and operate stably.

The above object of the present invention is achieved by an information processing apparatus receiving a carrier wave modulated in accordance with information and extracting the information and power from the carrier wave to thereby execute a predetermined process, wherein the information processing apparatus comprising: a receiving circuit receiving the carrier wave; a dc power generating circuit rectifying the carrier wave received by the receiving circuit to thereby generate dc power; a demodulation circuit, structurally independent of the dc power generating circuit, retrieving the information modulated onto the carrier wave; and an information processing circuit, supplied with the dc power as a power source, processing the information retrieved by the demodulation circuit in a given manner.

The above-mentioned object of the present invention is also achieved by a card-type information processing device receiving a carrier wave modulated in accordance with information and extracting the information and power from the carrier wave to thereby execute a predetermined process, wherein the card-type information processing device comprising: a receiving circuit receiving the carrier wave; a dc power generating circuit rectifying the carrier wave received by the receiving circuit to thereby generate dc power; a demodulation circuit, structurally independent of the dc power generating circuit, retrieving the information modulated onto the carrier wave; and an information processing circuit, supplied with the dc power as a power source, processing the information retrieved by the demodulation circuit in a given manner.

The above and other objects, features and advantages of the present invention will become more apparent from the following description when taken in conjunction with the accompanying drawings which illustrate preferred embodiments of the present invention by way of example.

BRIEF DESCRIPTION OF THE DRAWINGS

FIGS. 6(A), 6(B) and 6(C) are waveform diagrams showing an operation of a clock extraction block, wherein FIG. 6(A) shows a change of the voltage developing across a resistor with time, FIG. 6(B) shows a signal output by a Schmidt trigger circuit, and FIG. 6(C) shows an example of a signal output by a frequency dividing circuit;

DESCRIPTION OF THE PREFERRED EMBODIMENTS

Now, a description will be given of embodiments of the present invention with reference to the accompanying drawings.

Figure 1:
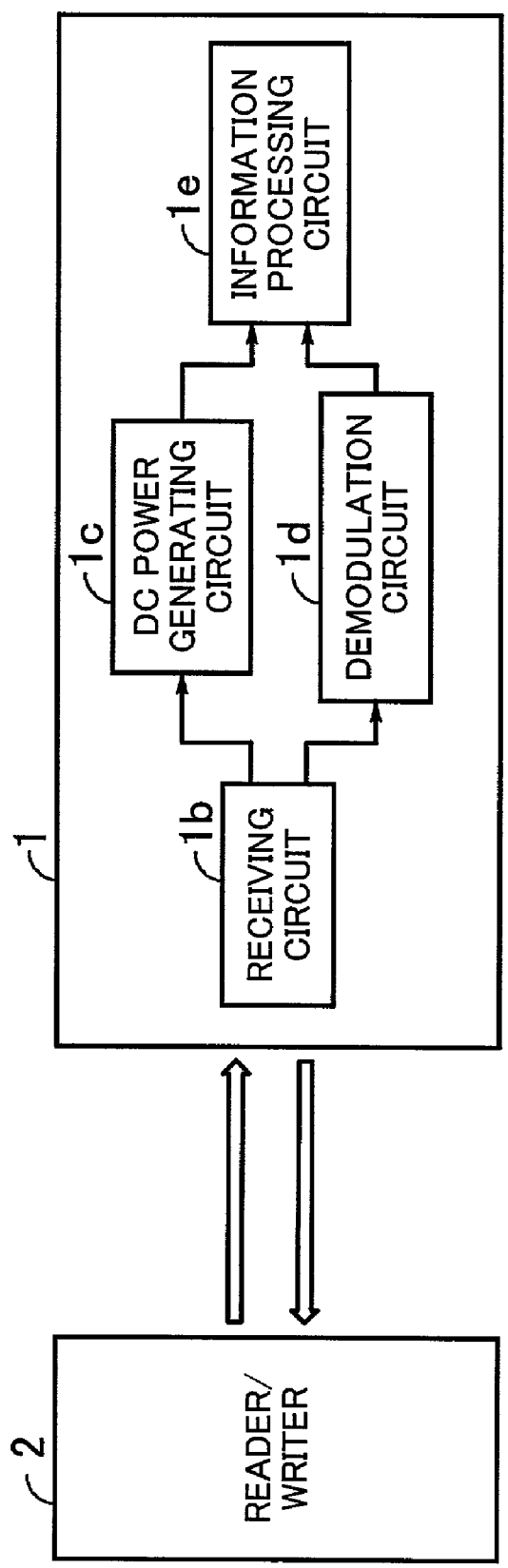
FIG. 1 is a block diagram of the operational principles of the present invention.

FIG. 1 is a block diagram of the operational principles of the present invention. As shown in FIG. 1, an information processing apparatus 1 includes a receiving circuit 1b, a dc power generating circuit 1c, a demodulation circuit 1d, and an information processing circuit 1e. The information processing apparatus 1 receives information modulated onto the carrier wave sent by a reader/writer 2 and processes the extracted information in a predetermined manner. Note that, FIG. 1 shows only receiving section of the system for simplicity, and therefore transmitting section is omitted.

The receiving circuit 1b receives the modulated carrier wave transmitted by the reader/writer 2 via a built-in antenna.

The dc power generating circuit 1c rectifies the carrier wave received by the receiving circuit 1b and thereby generates dc power.

The demodulation circuit 1d is independent of the dc power generating circuit 1c, and retrieves the information modulated onto the carrier wave.

The information processing circuit 1e utilizes the dc power generated by the dc power generating circuit 1c as power source, and processes the information retrieved by the demodulation circuit 1d in a predetermined manner.

The operation of the system shown in FIG. 1 is now described.

The reader/writer 2 ASK-modulates the carrier wave of a given frequency in accordance with information to be transmitted.

The receiving circuit 1b of the information processing apparatus 1 receives the modulated carrier wave captured by a built-in antenna, and converts the carrier wave into a corresponding electric signal.

The dc power generating circuit 1c fully rectifies the carrier wave from the receiving circuit 1b so that dc power can be generated.

The demodulation circuit 1d demodulates the carrier wave to retrieve information modulated onto the carrier wave.

The dc power generating circuit 1c includes rectifying elements for the full-wave rectifying and a capacitor for eliminating the ripple component. The demodulation circuit 1d includes a capacitor and a resistor for envelope detection of the carrier wave. These elements are independent of each other, so that interference between the elements can be avoided. This makes it possible to separately design the individual elements and simplify the design work.

The information processing circuit 1e processes the information from the demodulation circuit 1d in a given manner while utilizing the power from the dc power generating circuit 1c as power source.

As described above, the dc power generating circuit 1c and the demodulation circuit 1d are separated from and independent of each other, and are not interfered. In addition, the designing can be simplified because of the separate arrangement of the dc power generating circuit 1c and the demodulation circuit 1d.

A description will now be given of embodiments of the present invention.

Figure 2:
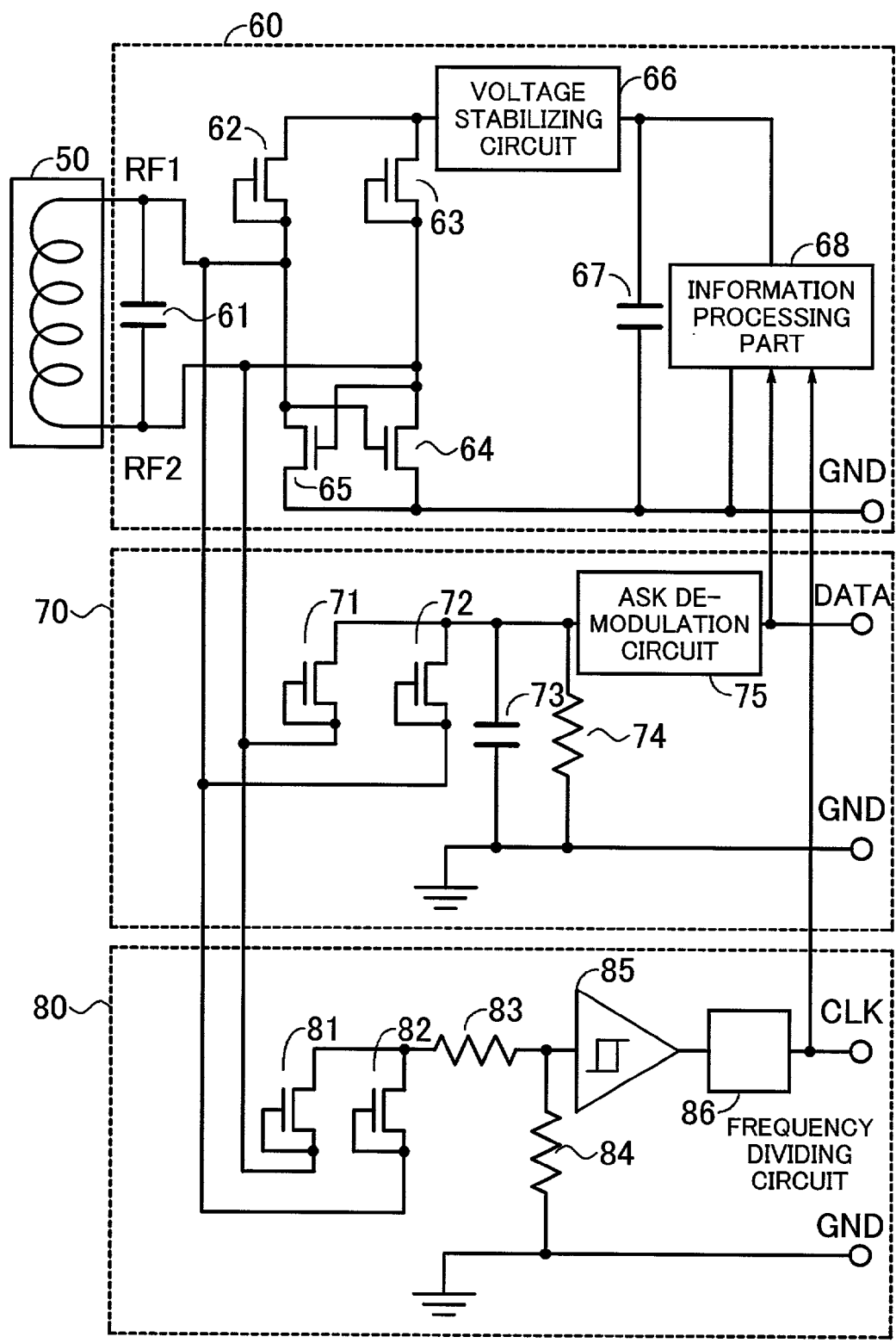
FIG. 2 is a circuit diagram of a configuration of an embodiment of the present invention.

FIG. 2 is a diagram of an embodiment of the present invention. A card-type information processing device according to this embodiment of the present invention includes an antenna 50, a power block 60, a signal block 70, and a clock extraction block 80. Here, the card-type information processing device may be a device having a housing that houses a semiconductor chip, such as a smart card or RFID (Radio Frequency IDentification).

Figure 10:
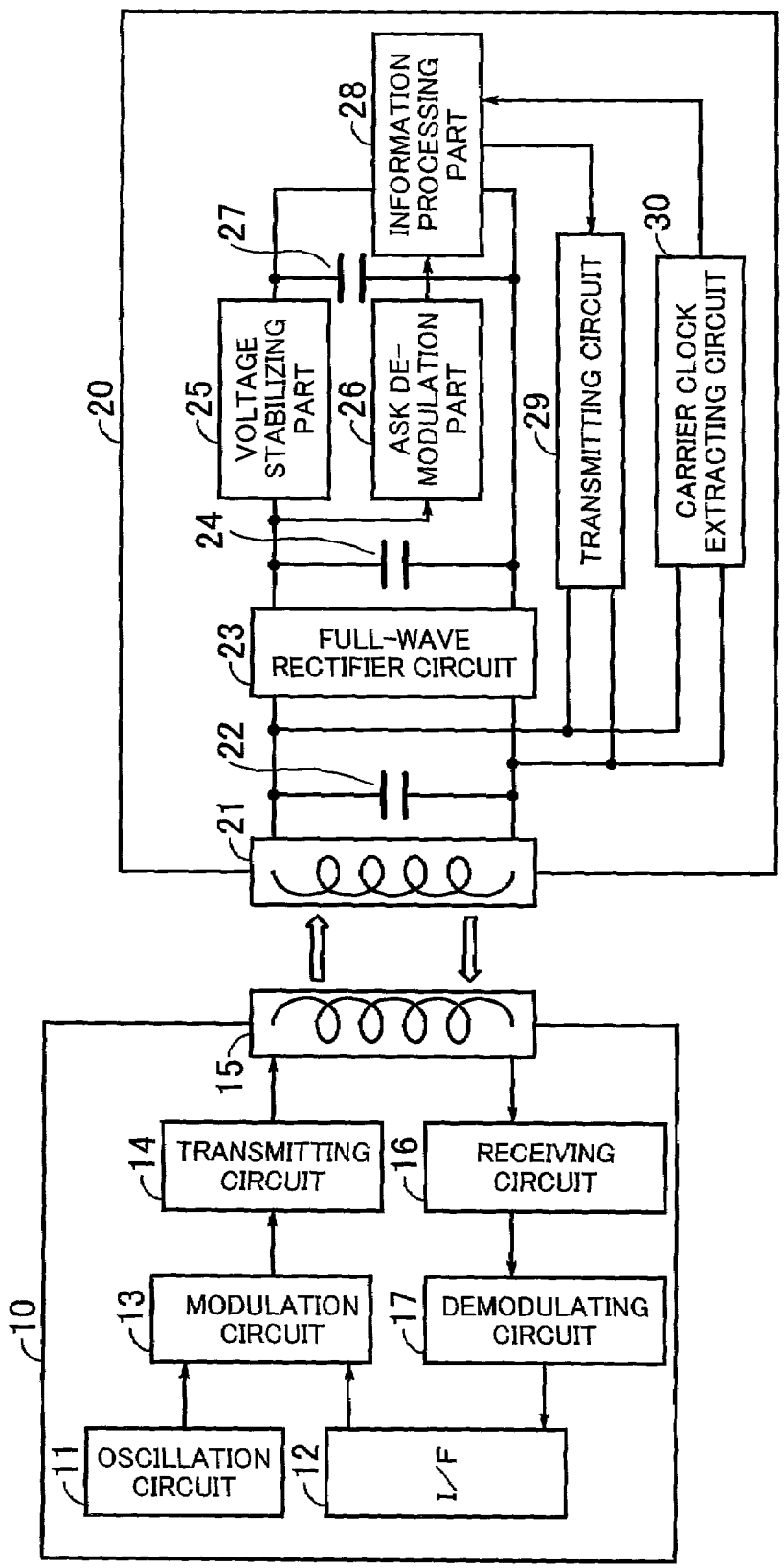
FIG. 10 is a block diagram of a card-type information processing device with the conventional type B contactless interface.

The reader/writer has the same configuration as that of the conventional one shown in FIG. 10, and a description thereof will be omitted.

The antenna 50 captures the radio wave transmitted by the reader/writer, and supplies it to the associated blocks.

The power block 60 is made up of a capacitor 61, N-channel MOS-FETs 62–65, a voltage stabilizing circuit 66, a capacitor 67 and an information processing part 68. The power block 60 extracts dc power serving as a power supply voltage from the RF signal from the antenna 50.

The N-channel MOS-FETs 62–65 form a full-wave rectifier circuit. The gate and drain of the N-channel MOS-FET 62 illustrated on the upper side of FIG. 2 are connected. Similarly, the gate and drain of the N-channel MOS-FET 63 are connected. The N-channel MOS-FETs 62 and 63 allow current to pass from the lower side of the drawing to the upper, and prevent current in the reverse direction.

The gate of one of the N-channel MOS-FETs 64 and 65 shown on the lower side of FIG. 2 is connected to the drain of the other. Basically, for RF1>RF2, the N-channel MOS-FETs 64 and 65 are ON and OFF, respectively. For RF1<RF2, the N-channel MOS-FETs 64 and 65 are OFF and ON, respectively.

The voltage stabilizing circuit 66 controls the voltage supplied to the information processing part 68 at a constant level.

The capacitor 67 eliminates the ripple component in the dc voltage supplied from the voltage stabilizing circuit 66, and supplies the energy to finish the power down sequence in the information processing part 68 even if power supply from the reader/writer is instantaneously broken down.

The information processing part 68 includes, for example, a CPU, a ROM, a RAM and an encrypt circuit, and processes information retrieved by the signal block 70 in various ways.

The signal block 70 is made up of N-channel MOS-FETs 71 and 72, a capacitor 73, a resistor 74 and an ASK demodulation circuit 75, and retrieves information modulated onto the RF signal.

The N-channel MOS-FETs 71 and 72 collaborate with the N-channel MOS-FETs 64 and 65 to form a full-wave rectifier circuit, which fully rectifies the RF signal from the antenna 50.

The capacitor 73 and the resistor 74 form an envelope detection circuit, which detects a signal from the N-channel MOS-FETs 71 and 72 and supplies the detected signal to the ASK demodulation circuit 75.

The ASK demodulation circuit 75 retrieves the signal from the envelope-detected signal in ASK demodulation.

Figure 3:
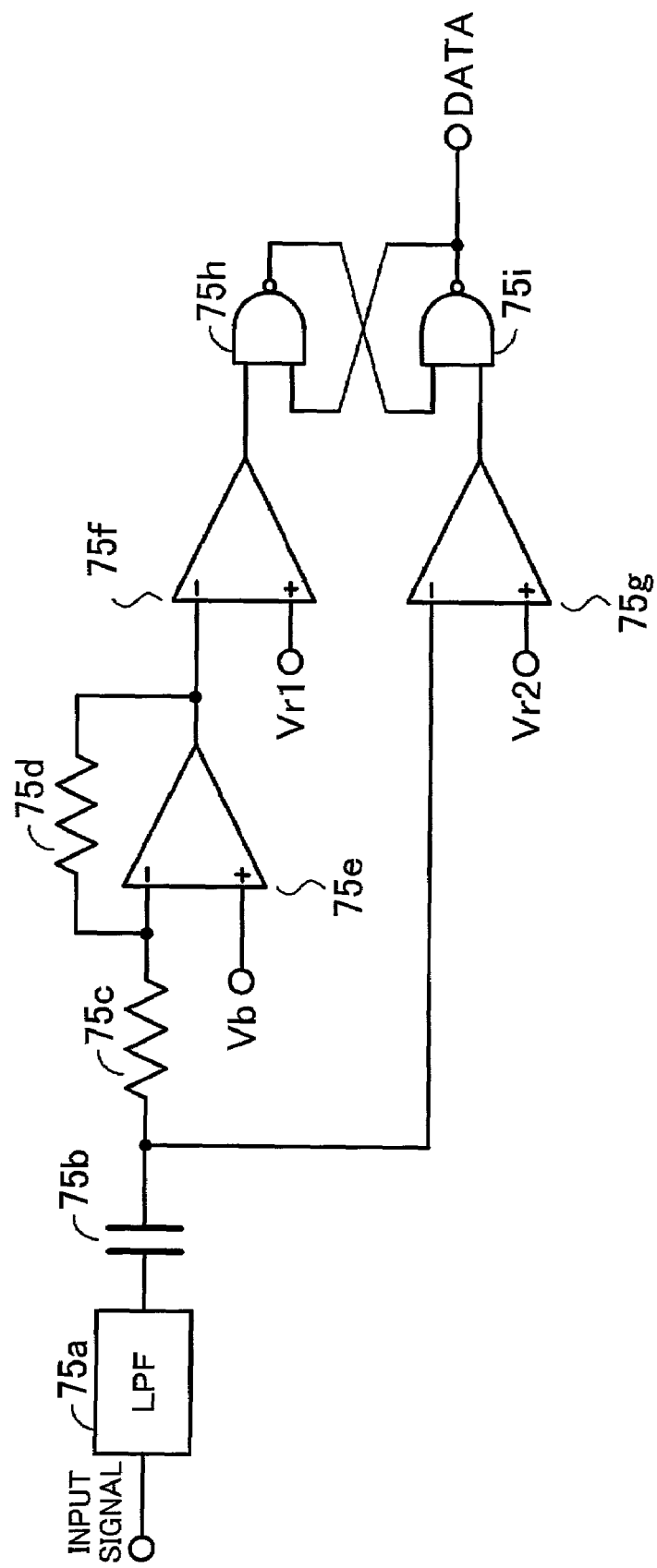
FIG. 3 is a circuit diagram of a configuration of an ASK demodulation circuit shown in FIG. 2.

FIG. 3 is a circuit diagram of a configuration of the ASK demodulation circuit 75. As shown in FIG. 3, the ASK demodulation circuit 75 is made up of a LPF (low-pass filter) 75a, a capacitor 75b, resistors 75c and 75d, an operational amplifier 75e, comparators 75f and 75g, and NAND elements 75h and 75i.

The LPF 75a eliminates an RF component contained in the signal after the envelope detection.

The capacitor 75b is a coupling capacitor, which eliminates a dc component contained in the envelope-detected signal.

The resistors 75c and 75d and the operational amplifier 75e form an inverting amplifier with an amplification factor of 1, which amplifier inverts the signal from the capacitor 75b. For the amplification factor equal to 1, the resistors 75c and 75d have an identical resistance value.

The comparator 75f compares the signal from the operational amplifier 75e with a reference voltage Vr1. Then, the comparator 75f outputs the power supply voltage when the input voltage is lower than the reference voltage Vr1, and outputs the ground (GND) voltage when the input voltage is higher than the reference voltage Vr1.

The comparator 75g compares the output signal of the capacitor 75b with a reference voltage Vr2. Then, the comparator 75g outputs the power supply voltage when the input voltage is lower than the reference voltage Vr2, and outputs the ground voltage when the input voltage is higher than the reference voltage Vr2.

The reference voltages Vr1 and Vr2 may be determined taking into account the performance of the individual circuits.

The NAND elements 75h and 75i form a latch circuit, which makes a set or reset operation in accordance with the signals from the comparators 75f and 75g. The output signal of the latch circuit has the level of the digital signal.

Returning to FIG. 2, the clock extraction block 80 is made up of N-channel MOS-FETs 81 and 82, resistors 83 and 84 a Schmidt trigger circuit 85, and a frequency dividing circuit 86, and generates a clock from the RF signal.

The N-channel MOS-FETs 81 and 82 cooperate with the N-channel MOS-FETs 64 and 65, and fully rectify the RF signal.

The resistors 83 and 84 are input resistors. A voltage divided by the resistors 83 and 84 are supplied to the Schmidt trigger circuit 85. The resistor 84 also acts to discharge the input capacitance of the Schmidt trigger circuit 85.

The Schmidt trigger circuit 85 shapes the waveform of the voltage developing across the resistor 84, and converts the voltage having the shaped waveform into a digital-level signal.

The frequency dividing circuit 86 divides the frequency of the output signal of the Schmidt trigger circuit 85 by 2.

An operation of the above-mentioned embodiment of the present invention will now be described.

Figure 4:
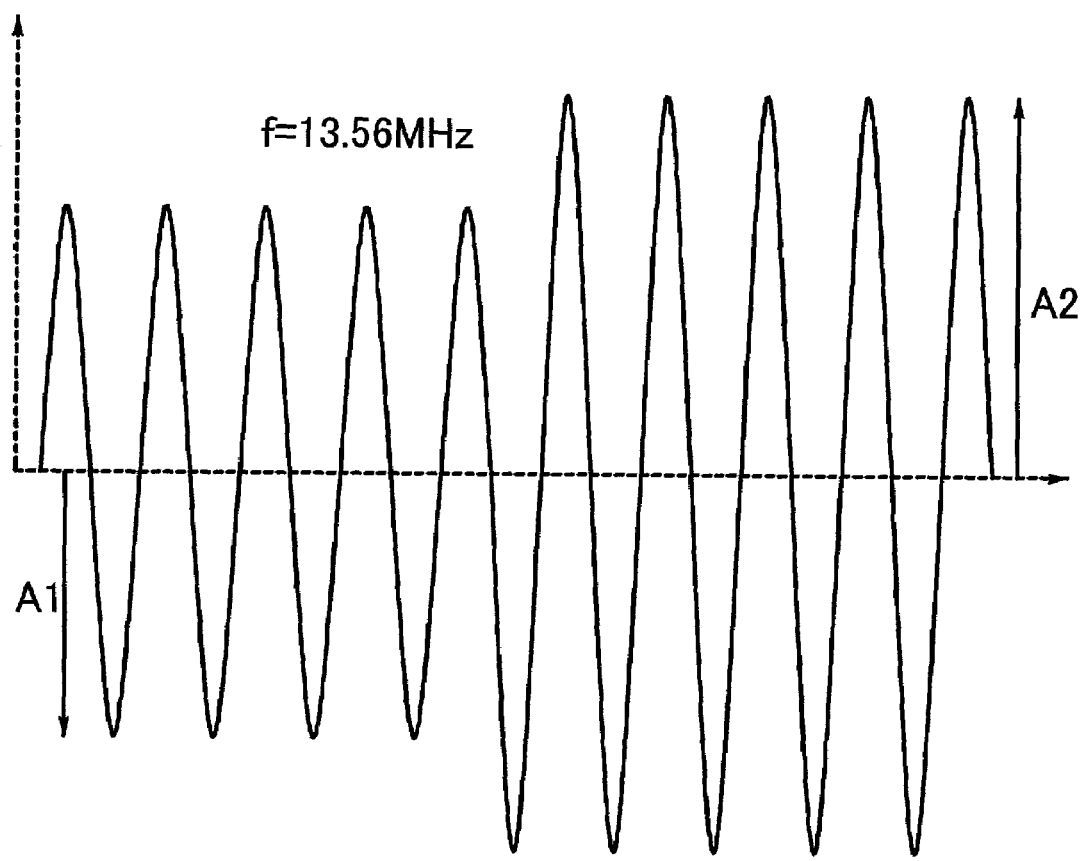
FIG. 4 is a waveform diagram of an example of radio wave sent by a reader/writer.

The reader/writer generates and transmits a radio wave as shown in FIG. 4. As shown in FIG. 4, the radio wave transmitted by the reader/writer includes "0" or "1" bit information ASK-modulated onto the carrier wave of a frequency of 13.56 MHz. More specifically, an amplitude A2, which is a high magnetic-field amplitude, corresponds to "1", and an amplitude A1, which is a low magnetic-field amplitude, corresponds to "0". The modulation factor defined as $\{(A2-A1)/(A1+A2)\} \times 100$ is set equal to 8–14%.

The radio wave as described above is captured by the antenna 50 and is converted into an electric signal based on the magnetic field intensity. The inductance component of the antenna 50 and the capacitor 61 form a parallel resonant circuit, which allows a larger power to be received than that available in the absence of the capacitor 61.

For RF1>RF2, the N-channel MOS-FETs 62 and 63 are ON and OFF, respectively. This allows current to flow in the voltage stabilizing circuit 66 from RF1.

For RF1<RF2, the N-channel MOS-FETs 63 and 62 are ON and OFF, respectively. This allows current to flow in the voltage stabilizing circuit 66 from RF2.

The voltage stabilizing circuit 66 refers to a reference voltage created by, for example, a band-gap reference circuit, and determines whether the voltage applied to the information processing part 68 has a given value. Based on the result of the voltage detection, the voltage stabilizing circuit 66 makes an intermittent supply of current so as to supply the load with a constant voltage.

The capacitor 67 eliminates the ripple component contained in the voltage output from the voltage stabilizing circuit 66, and supplies energy to the load circuit for a given time.

Preferably, the capacitor 67 has a capacitance of approximately 1000 pF in order to achieve the aforementioned objects of the invention. In the conventional circuit shown in FIG. 11, it is difficult to avoid interference with the envelope detection circuit when such a large capacitance is employed. In contrast, the present embodiment is capable of eliminating the interference because of an effective resistance of the N-channel MOS-FETs 62, 63, 71 and 72. It is therefore possible to accurately perform the envelope detection even when the capacitor 67 has a large capacitance.

Figure 11:
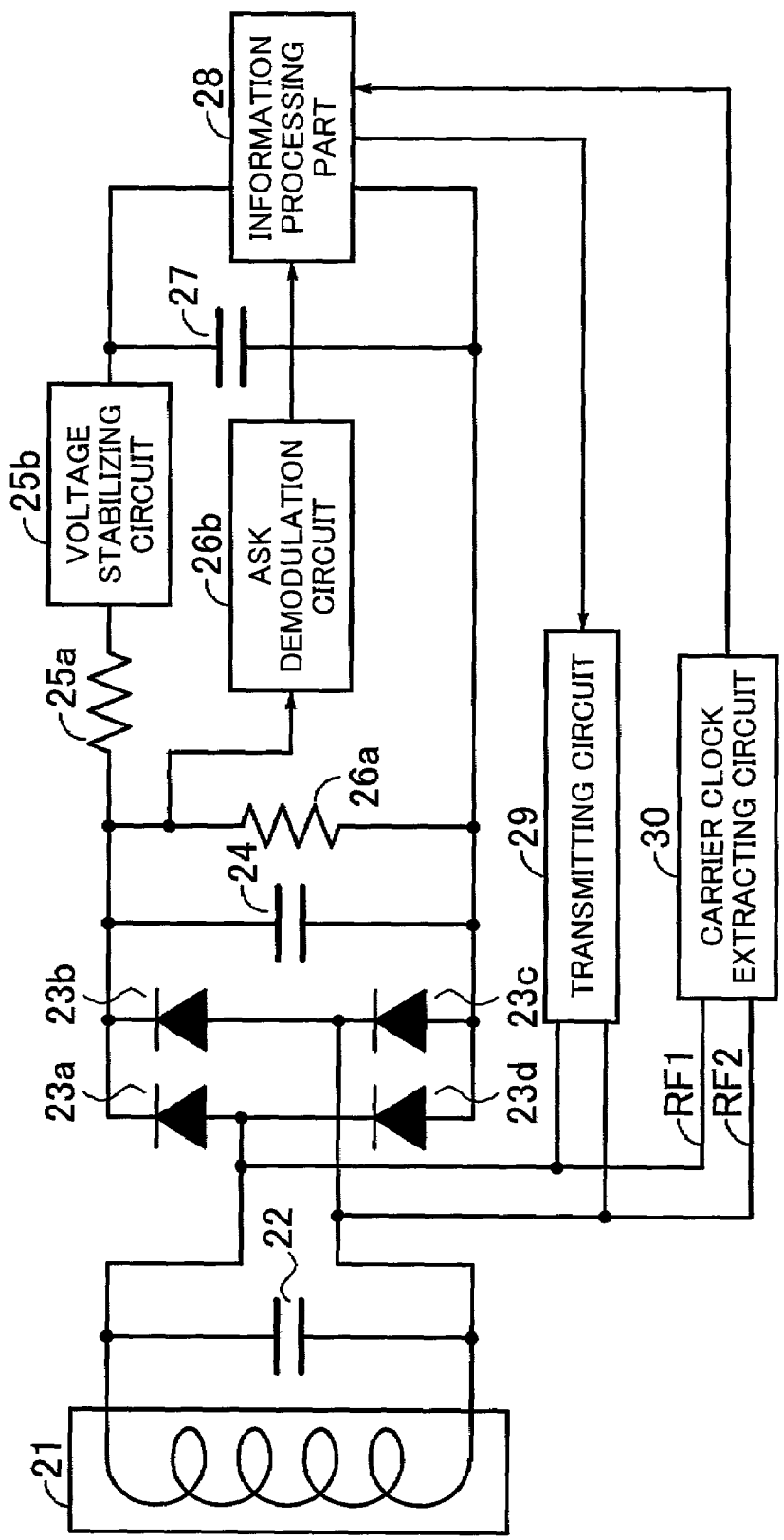
FIG. 11 is a block diagram of the card-type information processing device shown in FIG. 10.
Figure 12:
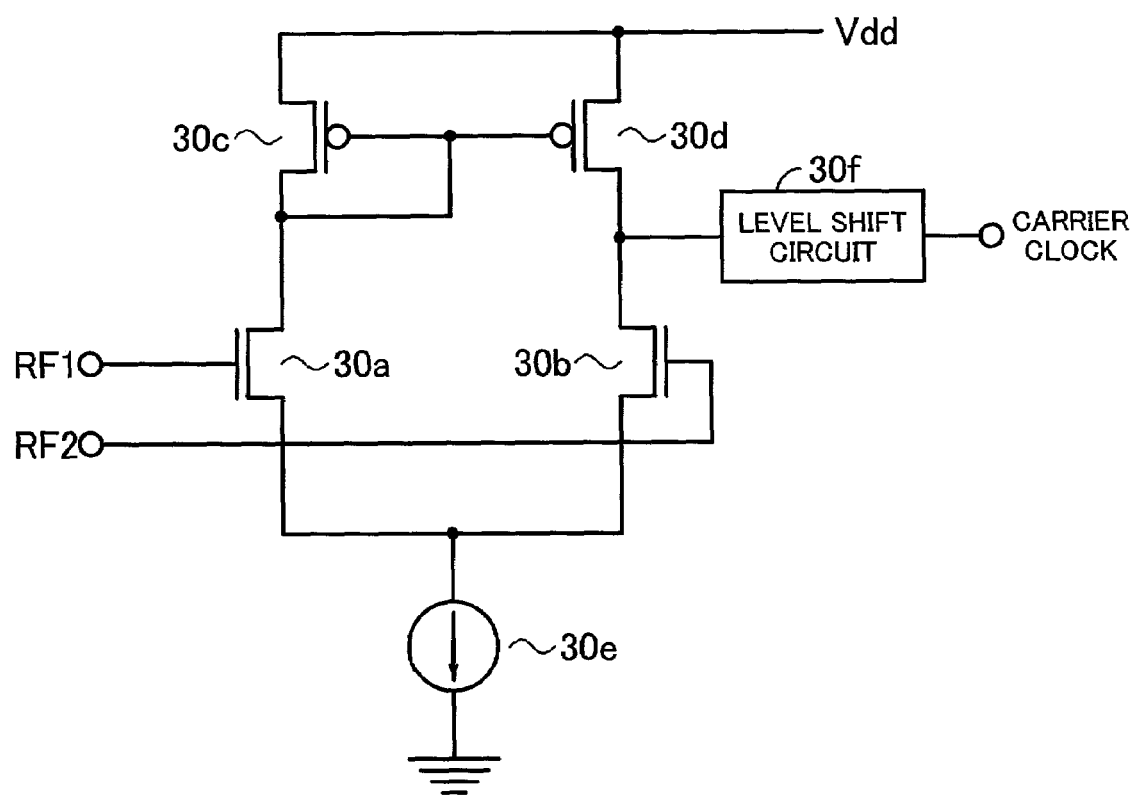
FIG. 12 is a circuit diagram of a carrier clock extraction circuit shown in FIG. 11.

In the case where the diodes 23*a*–23*d* are employed as in the conventional case shown in FIG. 11, the voltages RF1 and RF2 are fixed to constant levels due to the voltage stabilizing circuit 25*b* and the forward voltage drops (ordinary 0.7 V) of the diodes 23*a*–23*d*. Thus, the ASK demodulation cannot be carried out efficiently. In contrast, the use of the MOS-FETs avoids the above drawback.

Further, if the diodes are fabricated by the ordinary CMOS process, a substrate current may flow to cause latchup. In contrast, the use of the MOS-FETs avoids the occurrence of latchup.

A capacitance approximately equal to 1000 pF is easily realized by utilizing the fabrication process for ferroelectric memories. It is also possible to provide a capacitor associated with the input terminal of the voltage stabilizing circuit 66 and thus eliminate the ripple. With this arrangement, it is also possible to eliminate the interference with the signal block on the contrary to the conventional circuit.

The information processing part 68 executes various operations with dc power supplied from the capacitor 67.

The current output from the information processing part 68 flows out to RF2 via the N-channel MOS FET 64 for RF1>RF2. In contrast, for RF1<RF2, the current flows out to RF1 via the N-channel MOS-FET 65.

In the signal block 70, the N-channel MOS-FETs 71 and 72 rectify the RF signal in the same manner as that of the N-channel MOS-FETs 62 and 63.

Since the N-channel MOS-FETs 71 and 72 are not required to take power, these transistors may be formed by relatively compact elements. Thus, there is no substantial increase in the size of the present embodiment circuit because of the separate arrangement of the N-channel MOS-FETs 71 and 72.

Figure 5:
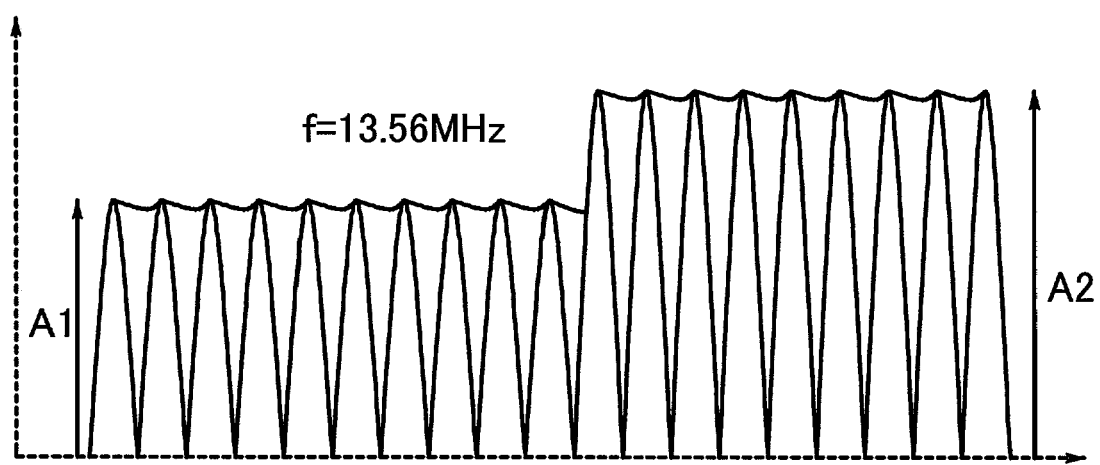
FIG. 5 is a waveform diagram of a signal obtained after envelope detection.

The capacitor 73 and the resistor 74 perform the envelope detection for the rectified RF signal. Thus, as shown in FIG. 5, the envelope connecting the peaks of the rectified RF signal is detected. The element values of the capacitor 73 and the resistor 74 are determined taking into consideration the frequency of the RF signal. Preferably, the resistor 74 has a resistance as large as possible in terms of suppression of power consumption. Our experiments exhibit that it is sufficient for the capacitor 73 to have a capacitance of at most 50 pF. For this capacitance value, it is sufficient for the resistor 74 to have a resistance value of 10 kΩ. In this case, the current value consumed by the resistor 74 is approximately 100 µA, which is sufficiently small.

The LPF 75*a* of the ASK demodulation circuit 75 takes only the signal component from the RF signal.

The capacitor 75*b* eliminates the dc component from the output signal of the LPF 75*a*.

The resistors 75*c* and 75*d* and the operational amplifier 75*e* invert the output signal of the capacitor 75*b*.

The comparator 75*f* compares the reference voltage Vr1 and the output of the operational amplifier 75*e*, and the comparator 75*g* compares the reference voltage Vr2 and the output of the capacitor 75*b*. Each of the comparators 75*f* and 75*g* outputs a positive voltage when the input voltage to be compared is lower than the reference voltage, and outputs a negative voltage when the input voltage is higher than the reference voltage.

The NAND elements 75*h* and 75*i* form a latch circuit, which is set by the output of the comparator 75*f* and is reset by the output of the comparator 75*g*. Thus, a waveform-shaped digital-level signal is available from the NAND element 75*h*.

The digital signal thus generated is supplied to the information processing part 68.

The signal component of demodulation flows in either RF1 or RF2 via the ground due to the function of the N-channel MOS-FETs 64 and 65 as has been described previously.

In the clock extraction block 80, the N-channel MOS-FETs 81 and 82 cooperate with the N-channel MOS-FETs 64 and 65 to fully rectify the high-frequency signal. As in the case of the aforementioned N-channel MOS-FETs 71 and 72, the N-channel MOS-FETs 81 and 82 are not required to take power and can be formed by relatively compact elements. Thus, there is no substantial increase in the size of the present embodiment circuit because of the separate arrangement of the N-channel MOS-FETs 81 and 82.

The resistors 83 and 84 divide the full-wave rectified signal at a given ratio, the divided voltage being applied to the Schmidt trigger circuit 85 and discharging the input capacitance thereof. Generally, the resistance value of the resistor 83 is smaller than that of the resistor 84.

The Schmidt trigger circuit 85 has two different threshold values respectively related to the rise and fall of the signal for waveform shaping and level conversion to the digital signal level.

The frequency dividing circuit 86 divides the frequency of the output of the Schmidt trigger circuit 85 by 2, the resultant signal being clock.

Figure 6A:
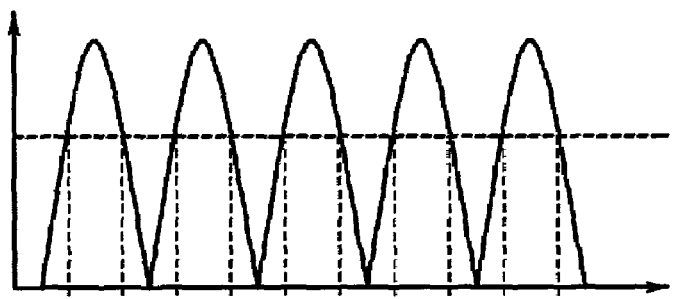
Figure 6B:
Figure 6C:
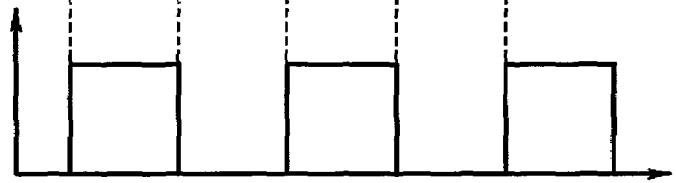

FIGS. 6(A), 6(B), and 6(C) are views showing the operation of the clock extraction block 80. More particularly, FIG. 6(A) shows a change of the voltage developing across the resistor 84 with time. As shown, the voltage across the resistor 84 is obtained by fully rectifying the high-frequency signal. The signal has a frequency of 27.12 MHz because it is obtained by fully rectifying the carrier wave of 13.56 MHz.

FIG. 6(B) shows an example of the signal that is output by the Schmidt trigger circuit 85. As shown, the output signal of the Schmidt trigger circuit 85 has been shaped into a rectangular waveform and has been adjusted so as to have the level of the digital signal.

FIG. 6(C) shows an example of the signal that is output by the frequency dividing circuit 86. As shown, the output of the frequency dividing circuit 86 is obtained by dividing the frequency of the output signal of the Schmidt trigger circuit 85 by 2. The signal output of the frequency dividing circuit 86 is 13.56 MHz, which is haft the frequency of 27.12 MHz.

The clock thus generated is supplied to the information processing part 68.

As described above, the power block 60 generates the power supply voltage from the carrier wave, and the signal block 70 extracts information modulated onto the carrier wave, the clock extraction block 80 generating the clock from the carrier wave and supplying it to the information processing part 68. Thus, the information processing part 68 operates with power supplied from the power block 60, and processes the information from the signal block 70 in synchronism with the clock from the clock extraction block 80.

As described above, according to the embodiment of the present invention, the power block 60 and the signal block 70 are independent of each other. This prevents the elements of the power block 60 and those of the signal block 70 from interfering each other, and enables simplified designing. Further, the most suitable elements can be employed as the resistors and capacitors, so that the power consumption can be reduced and the abilities of power supply and demodulation can be improved. This contributes to lengthening the communication distance.

In the present embodiment, the high-frequency signal is full-wave rectified and shaped into the appropriate waveform by the Schmidt trigger circuit 85, and is divided by 2 by the frequency dividing circuit 86. Thus, the clock having the duty ratio 50% can be generated.

Also, according to the present invention, the rectifying elements in each block employ MOS-FETs. This enhances affinity with the semiconductor process and effectively suppresses the occurrence of latchup because of the substrate current, as compared to the case with diodes. Further, each MOS-FET has a given ON resistance, which enhances isolation between blocks and suppresses the interference therebetween.

Another configuration of the signal block 70 is described below.

Figure 7:
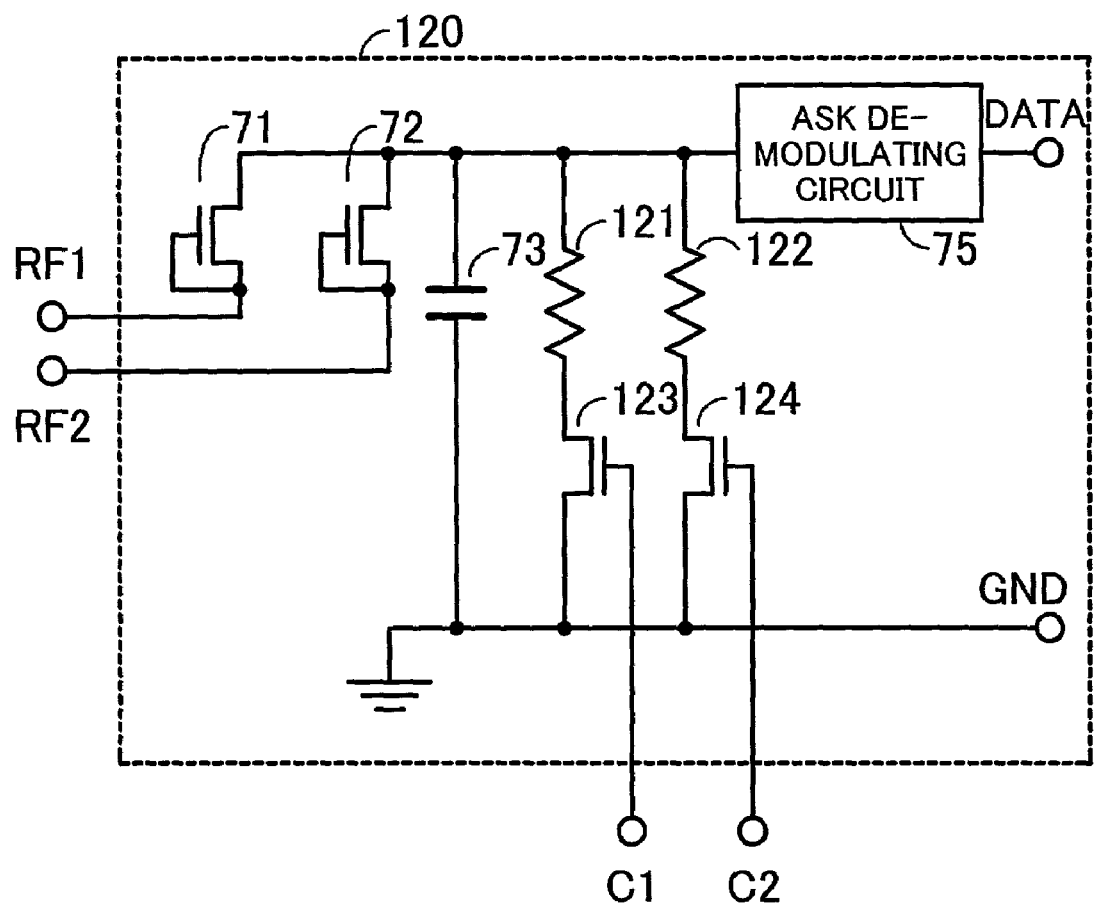
FIG. 7 is a circuit diagram of another configuration of the signal block shown in FIG. 2.

FIG. 7 is a circuit diagram of another configuration of the signal block 70. In FIG. 7, parts that are the same as those shown in FIG. 2 are given the same reference numerals, and a description thereof is omitted. A signal block 120 shown in FIG. 7 differs from that in FIG. 2 in that the resistor 74 shown in FIG. 2 is replaced by resistors 121 and 122 and N-channel MOS-FETs 123 and 124.

The N-channel MOS-FETs 123 and 124 are controlled by control signals C1 and C2, respectively, in which one of these, or both transistors is ON so that a corresponding one of the resistors 121 and 122 is connected to the circuit.

The resistors 121 and 122 have mutually different resistance values so as to have different time constants defined in connection with the capacitor 73. More specifically, the resistor 121 defines a time constant (large time constant) when the carrier wave has a low frequency, and the resistor 122 defines a time constant (small time constant) when the carrier wave has a high frequency. For example, the resistor 121 has a resistance value of about 40 kΩ, and the resistor 122 has a resistance value of about 20 kΩ in a case where there are two data transmission rates of 105.9375 Kbps and 211.875 Kbps and the capacitor 73 has a capacitance of 50 pF.

Thus, when the frequency of the carrier wave is low, only the N-channel MOS-FET 123 is turned ON. In contrast, when the frequency of the carrier wave is high, only the N-channel MOS-FET 124 is turned ON. As a result, the envelope detection is performed at the optimal time constant.

In the above-mentioned manner, the resistance is selected in accordance with the frequency of the carrier wave, the envelope detection is performed at the optimal time constant. Thus, the accuracy of the envelope detection can be improved and power consumption at low frequency can be reduced.

Although the above embodiment of the invention employs two resistors, more than two resistors may be provided and selectively used.

Next, another configuration of the full-wave rectifier circuit in the power block 60 is described with reference to FIG. 8.

Figure 8:
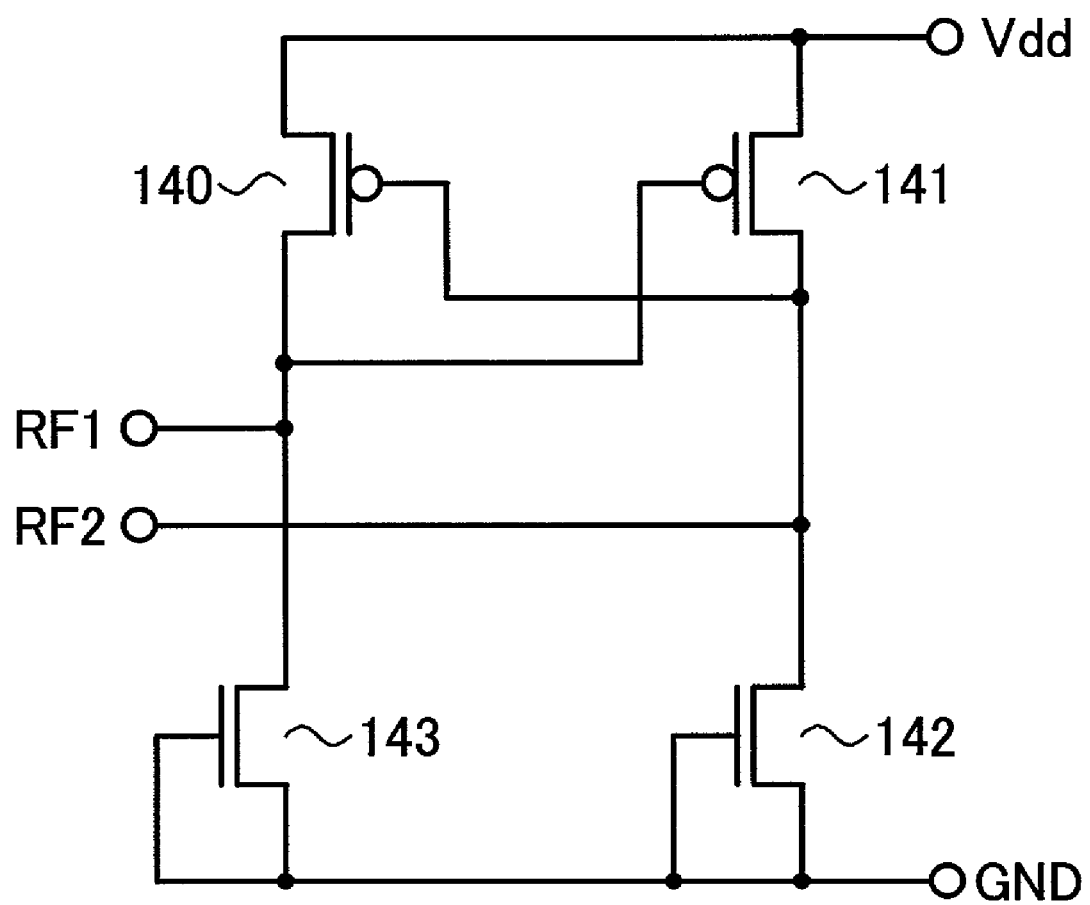
FIG. 8 is a circuit diagram of another configuration of a full-wave rectifier circuit with which the power block shown in FIG. 2 is equipped.

Referring to FIG. 8, the power block 60 is made up of P-channel MOS-FETs 140 and 141 and two N-channel MOS-FETs 142 and 143.

More particularly, the sources of the P-channel MOS-FETs 140 and 141 are connected to RF1 and RF2, respectively, and the drains thereof are connected to Vdd. The gate of one of the FETs 140 and 141 is connected to the source of the other.

The gates and drains of the N-channel MOS-FETs 142 and 143 are connected to ground GND, and the sources thereof are connected to RF2 and RF1, respectively.

The circuit shown in FIG. 8 operates as follows.

For RF1>RF2, the P-channel MOS-FET 140 is turned ON, while the P-channel MOS-FET 141 is turned OFF. Thus, current flows to Vdd from RF1 via the P-channel MOS-FET 140.

Here, the diode connected N-channel MOS-FET 142 is forward biased and is turned ON for GND>RF2, while the diode connected N-channel MOS-FET 143 is reverse biased and is turned OFF. Thus, the current that is input from Vdd and flows in the circuit flows out to RF2 via the N-channel MOS-FET 142.

For RF1<RF2, the P-channel MOS-FET 140 is turned OFF, while the P-channel MOS-FET 141 is turned ON. Thus, current flows to Vdd from RF2 via the P-channel MOS-FET 141.

Here, the diode connected N-channel MOS-FET 143 is forward biased and is turned ON for GND<RF2, while the diode connected N-channel MOS-FET 142 is reverse biased and is turned OFF. Thus, the current that is input from Vdd and flows in the circuit flows out to RF1 via the N-channel MOS-FET 143.

As described above, on the contrary to FIG. 2, the switch circuit formed by P-channel MOS-FETs is used in the upper half of the circuit, the full-wave rectifying operation is realized as in the case of FIG. 2.

A description will now be given of yet another configuration of the full-wave rectifier circuit in the power block 60 with reference to FIG. 9.

Figure 9:
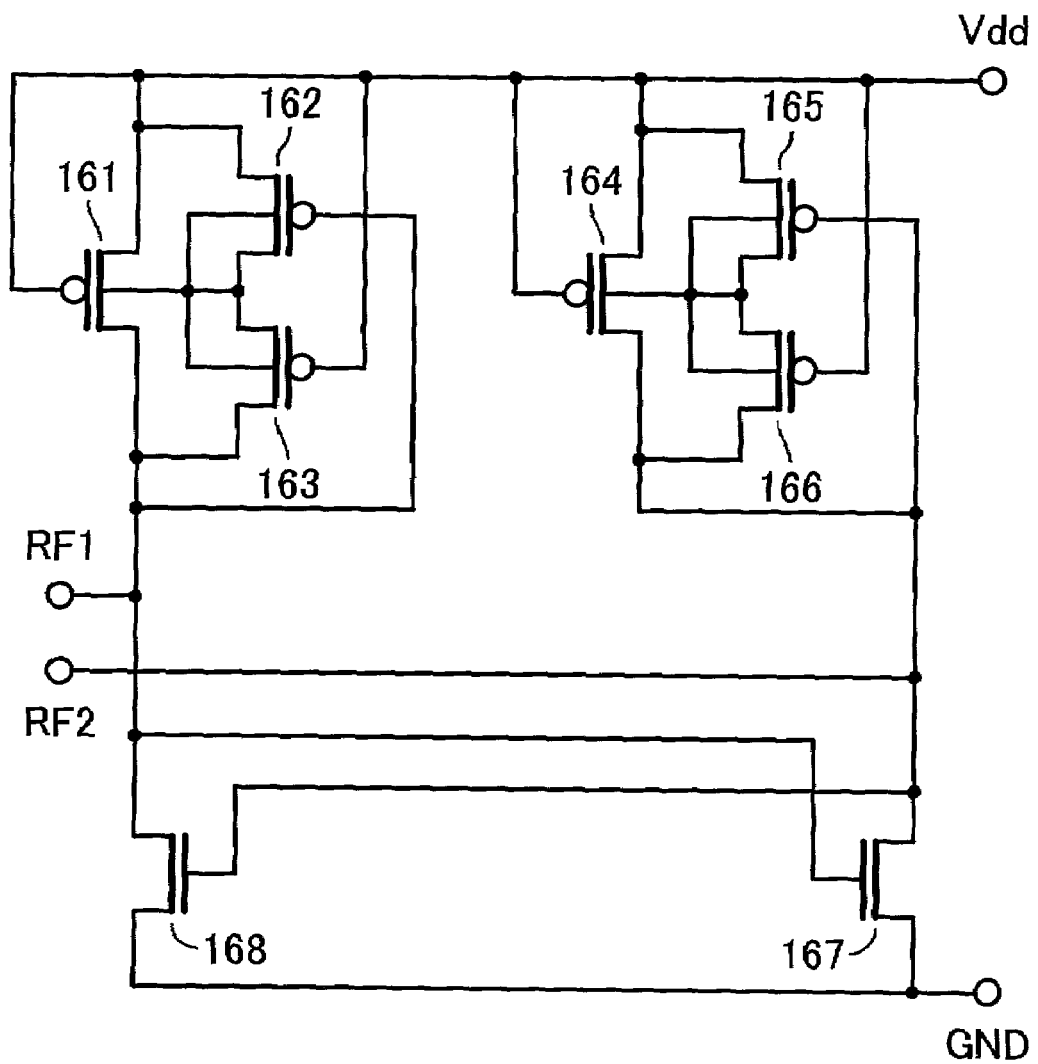
FIG. 9 is a circuit diagram of yet another configuration of the full-wave circuit with which the power block shown in FIG. 2 is equipped.

Referring to FIG. 9, the full-wave rectifier circuit is made up of P-channel MOS-FETs 161–166 and N-channel MOS-FETs 167 and 168.

More specifically, the source of the P-channel MOS-FET 161 is connected to RF1, and the gate and drain thereof are connected to Vdd, the substrate thereof being connected to the drain of the P-channel MOS-FET 162, its substrate, the drain of the P-channel MOS-FET 163 and its substrate.

The source of the P-channel MOS-FET 162 is connected to Vdd, and the gate thereof is connected to RF1, the drain and substrate thereof being connected to the substrate of the P-channel MOS-FET 161 and the drain and substrate of the P-channel MOS-FET 163.

The source of the P-channel MOS-FET 163 is connected to RF1, and the gate thereof is connected to Vdd, the drain and substrate thereof being connected to the substrate of the P-channel MOS-FET 161 and the drain and substrate of the P-channel MOS-FET 162.

The source of the P-channel MOS-FET 164 is connected to RF2, and the gate and drain thereof is connected to Vdd, the substrate thereof being connected to the drain and substrate of the P-channel MOS-FET 165 and the drain and substrate of the P-channel MOS-FET 166.

The source of the P-channel MOS-FET 165 is connected to Vdd, and the gate thereof is connected to RF2, the drain and substrate thereof being connected to the substrate of the P-channel MOS-FET 164 and the drain and substrate of the P-channel MOS FET 166.

The source of the P-channel MOS-FET 166 is connected to RF2, and the gate thereof is connected to Vdd, the drain and substrate thereof being connected to the substrate of the MOS-FET 164 and the drain and substrate of the P-channel MOS-FET 165.

The source of the N-channel MOS-FET 167 is connected to GND, and the gate thereof is connected to RF1, the drain being connected to RF2.

The source of the N-channel MOS-FET 168 is connected to GND, and the gate thereof is connected to RF2, the drain being connected to RF1.

The circuit shown in FIG. 9 operates as follows.

First, a case where RF1>RF2 is described. In this case, the P-channel MOS-FET 161 is forward biased and is turned ON, while the P-channel MOS-FET 164 is reverse biased and is turned OFF.

At that time, the P-channel MOS-FET 162 is reverse biased and is turned OFF, while the P-channel MOS-FET 163 is forward biased and is turned ON. Thus, the substrate of the P-channel MOS-FET 161 is set at the potential of RF1, which is the highest applied thereto. Thus, a diode that is parasitic on the P-channel MOS-FET 161 is turned OFF so that the occurrence of latchup can be prevented.

In contrast, the P-channel MOS-FET 165 is forward biased and is turned ON, while the P-channel MOS-FET 166 is reverse biased and is turned OFF. Thus, the substrate of the P-channel MOS-FET 164 is set at the potential of Vdd, which is the highest applied thereto.

A case where RF1<RF2 is described below.

In this case, the P-channel MOS-FET 161 is reverse biased and is turned OFF, while the P-channel MOS-FET 164 is forward biased and is turned ON.

At that time, the P-channel MOS-FET 165 is reverse biased and is turned OFF, while the P-channel MOS-FET 166 is forward biased and is turned ON. Thus, the substrate of the P-channel MOS-FET 164 is set at the potential of RF2, which is the highest voltage applied thereto.

In contrast, the P-channel MOS-FET 162 is forward biased and is turned ON, while the P-channel MOS-FET 163 is reverse biased and is turned OFF. Thus, the substrate of the P-channel MOS-FET 161 is set at the potential of Vdd, which is the highest applied thereto.

As described above, according to the embodiment shown in FIG. 9, the use of the P-channel MOS-FETs avoids the substrate biasing effect, as compared to the rectifying circuit with the N-channel MOS-FETs shown in FIG. 2 and suppresses voltage drop at the time of ON. This improves the rectifying efficiency.

As described above, according to the present invention, there is provided an information processing apparatus receiving a carrier wave modulated in accordance with information and extracting the information and power from the carrier wave to thereby execute a predetermined process, wherein the information processing apparatus includes: a receiving circuit receiving the carrier wave; a dc power generating circuit rectifying the carrier wave received by the receiving circuit to thereby generate dc power; a demodulation circuit, structurally independent of the dc power generating circuit, retrieving the information modulated onto the carrier wave; and an information processing circuit, supplied with the dc power as a power source, processing the information retrieved by the demodulation circuit in a given manner. With the above structure, it is possible to realize higher performance and lower power consumption of the demodulation circuit.

There is also provided a card-type information processing apparatus receiving a carrier wave modulated in accordance with information and extracting the information and power from the carrier wave to thereby execute a predetermined process, wherein the card-type information processing device includes: a receiving circuit receiving the carrier wave; a dc power generating circuit rectifying the carrier wave received by the receiving circuit to thereby generate dc power; a demodulation circuit, structurally independent of the dc power generating circuit, retrieving the information modulated onto the carrier wave; and an information processing circuit, supplied with the dc power as a power source, processing the information retrieved by the demodulation circuit in a given manner. Thus, it is possible to more easily design the card-type information processing device.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An information processing apparatus receiving a carrier wave modulated in accordance with information and extracting the information and power from the carrier wave to thereby execute a predetermined process, said information processing apparatus comprising:
    a receiving circuit receiving the carrier wave;
    a dc power generating circuit rectifying the carrier wave received by the receiving circuit to thereby generate dc power;
    a demodulation circuit, structurally independent of the dc power generating circuit, retrieving the information modulated onto the carrier wave, and wherein said demodulation circuit comprises a rectifying element, a plurality of resistors with different resistance valves and a capacitor for demodulation by envelope detection and the envelope detection is performed with a time constant determined by the capacitor and one of the resistors selected in accordance with the frequency of the carrier wave;
    an information processing circuit, supplied with the dc power as a power source, processing the information retrieved by the demodulation circuit in a given manner; and
    a clock signal generating circuit generating a clock from the carrier wave received by said receiving circuit, wherein said clock signal generating circuit is independent of said dc power generating circuit and said demodulation circuit, and wherein said clock signal generating circuit comprises:
    a full-wave rectifying circuit fully rectifying the carrier wave;
    a waveform shaping circuit shaping a waveform of a signal output by the full-wave rectifying circuit; and
    a frequency dividing circuit dividing a frequency of a waveform-shaped signal from the waveform shaping circuit.

2. The information processing apparatus as claimed in claim 1, wherein:
    said demodulation circuit comprises a full-wave rectifying circuit for demodulation by envelope detection.

3. A card-type information processing device receiving a carrier wave modulated in accordance with information and extracting the information and power from the carrier wave to thereby execute a predetermined process, said card-type information processing device comprising:

a receiving circuit receiving the carrier wave;

a dc power generating circuit rectifying the carrier wave received by the receiving circuit to thereby generate dc power;

a demodulation circuit, structurally independent of the dc power generating circuit, retrieving the information modulated onto the carrier wave, and wherein said demodulation circuit comprises a rectifying element, a plurality of resistors with different resistance valves and a capacitor for demodulation by envelope detection and the envelope detection is performed with a time constant determined by the capacitor and one of the resistors selected in accordance with the frequency of the carrier wave;

an information processing circuit, supplied with the dc power as a power source, processing the information retrieved by the demodulation circuit in a given manner; and a clock signal generating circuit generating a clock from the carrier wave received by said receiving circuit, wherein said clock signal generating circuit is independent of said dc power generating circuit and said demodulation circuit, and wherein said clock signal generating circuit comprises:

a full-wave rectifying circuit fully rectifying the carrier wave;

a waveform shaping circuit shaping a waveform of a signal output by the full-wave rectifying circuit; and a frequency dividing circuit dividing a frequency of a waveform-shaped signal from the waveform shaping circuit.

4. The card-type information processing device as claimed in claim 3, wherein:

said demodulation circuit comprises a full-wave rectifying circuit for demodulation by envelope detection.

* * * * *